No. 661,905. Patented Nov. 13, 1900.
E. J. BRYAN.
HORSE HOE AND CULTIVATOR.
(Application filed Apr. 16, 1900.)
(No Model.) 2 Sheets—Sheet 1.
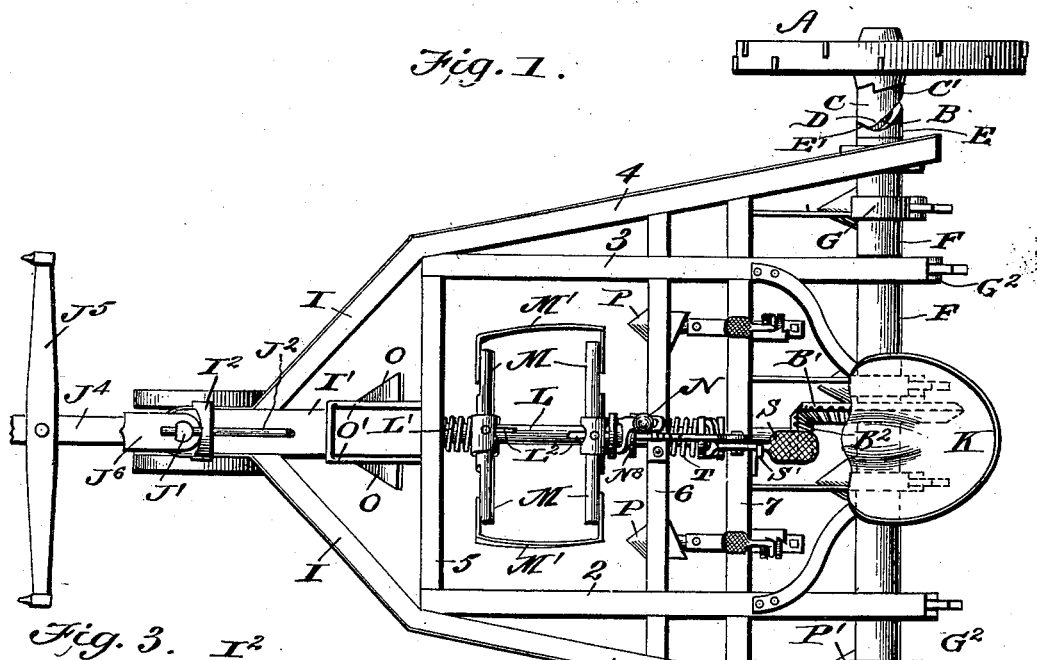
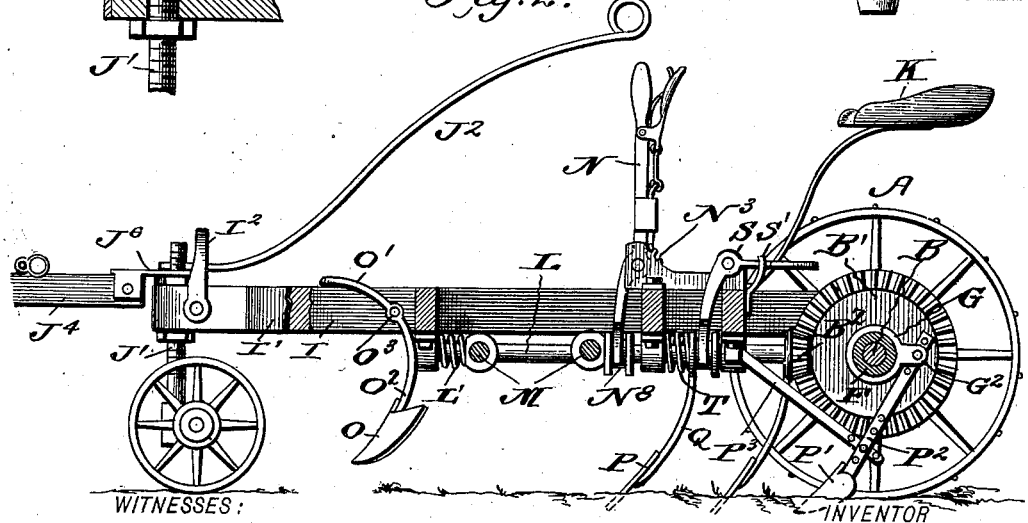
WITNESSES: M. P. Blondel. Percy B. Turpin.
INVENTOR Edward J. Bryan
BY Munn & Co.
ATTORNEYS No. 661,905. Patented Nov. 13, 1900.
E. J. BRYAN.
HORSE HOE AND CULTIVATOR.
(Application filed Apr. 16, 1900.)
(No Model.)
2 Sheets—Sheet 2.
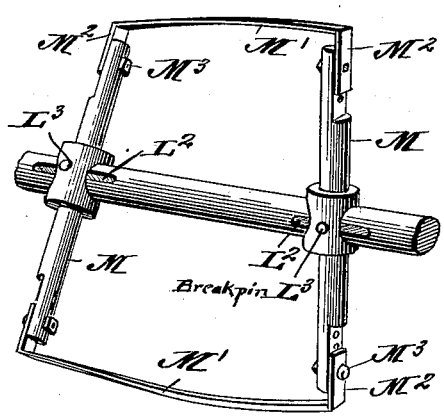
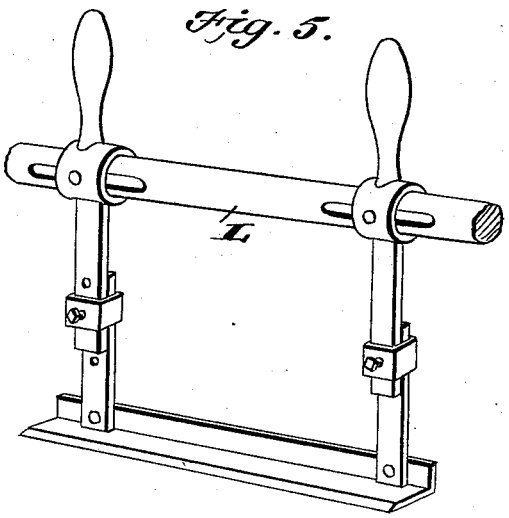
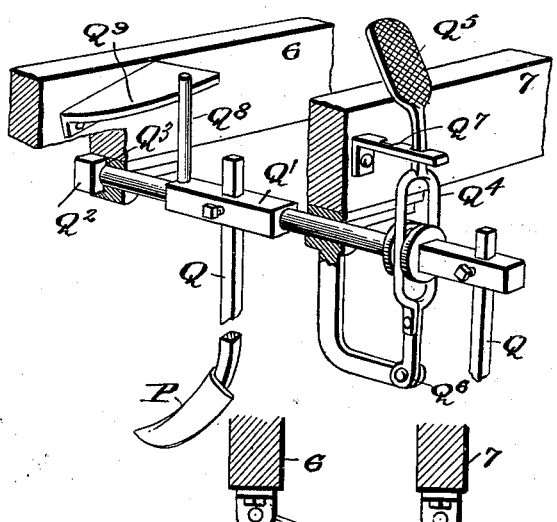
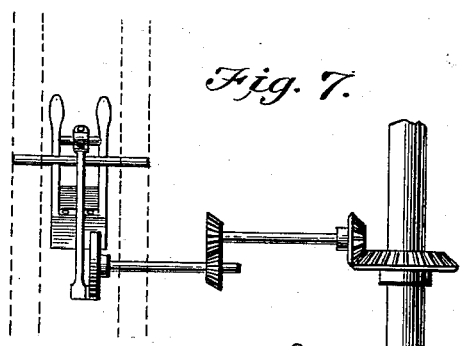
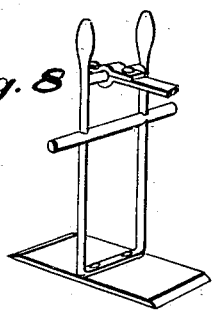
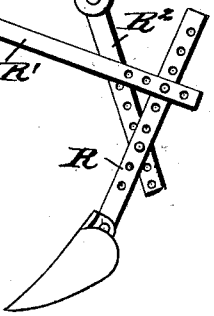
WITNESSES:
M. S. Blondel.
Perry B. Turpin.
INVENTOR
Edward J. Bryan.
BY Munn & Co.
ATTORNEYS
THE NORRIS PETERS CO., PHOTO-LITHO., WASHINGTON, D. C.

UNITED STATES PATENT OFFICE.

EDWARD JEFFERSON BRYAN, OF ATLANTA, GEORGIA.

HORSE HOE AND CULTIVATOR.

SPECIFICATION forming part of Letters Patent No. 661,905, dated November 13, 1900.

Application filed April 16, 1900. Serial No. 13,045. (No model.)

*To all whom it may concern:*

Be it known that I, EDWARD JEFFERSON BRYAN, residing at Atlanta, in the county of Fulton and State of Georgia, have invented certain new and useful Improvements in a Horse Hoe and Cultivator Combined, of which the following is a specification.

My invention is an improvement in devices having for an object to provide improved mechanism by the use of which I will be able to bar off or scrape to narrow ridges the beds forming the row, will be able to chop or hoe the desired space out of the row of plants, can dirt the plant after hoeing, means being provided to prevent the covering of the plant, and can plow, cultivate, pulverize, or rake the full width of the row, as may be desired, all being done with one trip of the machine.

The invention consists in certain improvements, as will be hereinafter described and claimed.

In the drawings, Figure 1 is a top plan view, and Fig. 2 is a sectional side view, of the machine. Fig. 3 is a detail view of the shaft for the steering-wheels. Fig. 4 is a detail view of the chopper. Fig. 5 shows a modified form of same. Fig. 6 illustrates the means for operating the dirting-up shovels. Figs. 7 and 8 are detail views illustrating another modified form of chopper. Fig. 9 illustrates one of the cultivating-shovels and its supporting devices.

The wheels A are supported on the opposite ends of the axle B and are clutched thereto, preferably, by means of the collars C, free on the axle, and which may be constructed, as shown, with the ratcheted outer ends C' and with their inner ends curved or inclined at D to engage a cam-face E', fixed on the axle so the wheels will freely revolve on the axle when rolled backward, but will clamp the axle on forward motion, thus operating the gear. Manifestly this may be accomplished by the ordinary ratchet-and-pawl clutch; but I prefer the construction as shown and which I will now more specifically describe.

In the construction shown the cam-face E' is at the outer end of a sleeve E, which encircles the axle and is suitably fixed thereto.
This cam-face inclines outwardly toward its forward end and operates to throw the collar C outward when the latter is turned forward against the said surface E' by the action of the ratchet-tooth on the wheel A as the latter turns forward. On the backward movement of the wheel the inclined faces of its ratchet-teeth slip past the corresponding faces of the collar C and the latter is freed from engagement with the cam E' so the wheel can revolve on the axle.

The axle B is provided at about its middle with the gear B', arranged to turn with the axle and transmit the motion thereof to the chopping devices presently described.

On the axle B are fitted the sleeves F F, carried by the frame-beams and within which the axle is free to revolve. To these sleeves F are secured at their rear ends the longitudinal beams 1, 2, 3, and 4 of the main frame of the machine. The boxes G are secured upon the sleeves E. At their rear sides the boxes G are provided with lugs G², to which are pivoted the standards of the cultivating-shovels presently described.

The main frame has cross-bars 5, 6, and 7, which extend between and connect its longitudinal bars and form a proper support for the chopping devices, as presently described. A subframe consisting of the inwardly-inclined bars I and the central bar I' extends in advance of the beam 5 and forms a support in which is journaled the upright shaft J' of the front supporting and steering frame, which shaft has a handle J², which may extend in convenient reach from the driver's seat K, as shown. The subframe I I' may be provided with a clevis I² for connection with the doubletree, so the team can be hitched directly to the frame, thus freeing the front or guide wheels and permitting them to be accurately guided on plant-rows. The handle-bar J² may be connected directly with the upper end of the shaft J'. To this end the shaft J' is provided, near its upper end, with a transverse opening J³, through which the front end of the rod J² is passed. This construction may also be utilized for connecting the pole J⁴, bearing the doubletree J⁵ and having at its rear end a plate J⁶, perforated to fit over the upper end of the shaft J' below the perforation J³, so it can be secured by the handle-rod, as shown. This permits the pole to swing freely from side to side, so it will not in any way interfere with the guiding of the implement by the handle J² before described.

The shaft J' is threaded and receives nuts above and below the frame, so the frame can be raised or lowered at its front end.

The chopping devices include a shaft L, which extends in the direction of length of the machine and is journaled in suitable supports, so it can be rotated within the main frame. Upon this shaft I support the chopper, which is composed of the spoke-like arms M M, which extend on opposite sides of the shaft L and support the chopping-blades M' at their ends. The blades M' may be slightly twisted, as shown in Figs. 1 and 4, or they may be provided with a back plate and made straight, as shown in Fig. 5. In this figure the blade is at one end only of the arms, their other ends being counterpoised. The blades may be adjustably connected with the arms M by securing the short shanks M², attached to said blades, to the arms M by bolts M³ passing through one of a series of perforations, so the blades can be set nearer to or farther from the shaft L to vary the depth of the cut. A somewhat different construction for securing this adjustment is shown in Fig. 5.

The chopping device is movable longitudinally upon the shaft L and is pressed normally to the rear by means of the spring L', which encircles the shaft L in advance of the foremost arm M, and by pressing against the same tends to force the chopping device to the rear. The chopping device may be brought forward upon the shaft L by means of a lever N, acting upon a grooved collar N³, which operates against the rearmost one of the arms M. By this lever N the chopping device may be set forward against the action of the spring L' and be held in any desired adjustment by the rack N³, as shown in Fig. 2. By thus moving the chopping device forward and back the same can be adjusted to regulate the location of cut in the row and also to protect the plants, and, further, to equalize the loss of motion due to uneven ground which may develop in rehoeing the same field.

The shaft L may be round or square. When square, the arms M should have openings to fit the shaft, and when round the shaft may be slotted longitudinally at L² to receive break-pins L³, which key the arms M to the shaft and yet will break under excessive strain or when the cutter strikes an unusual obstruction. It will be understood that the cutters M' may be removed and others of any desired length substituted.

I support shovels O in advance of the chopping devices and suitably arranged for barring off the earth alongside the rows of plants. These shovels O may be supported, as shown, so they can be moved up out of the way when desired. To this end the shovels are shown as supported on the double standard, which is bowed at O' above the beam I' and has its upright arms O², which support the shovels, pivoted at O³ to the beam, so the shovels can be adjusted to the full-line position shown in Fig. 2 for use or when not in use be adjusted to the dotted position indicated in the same figure. I also provide shovels P and P' in rear of the chopping devices. The covering-shovels P are carried upon standards Q, which are secured at their upper ends to the shaft Q'. The shaft Q' is journaled and movable longitudinally in the frame-beams and has at its end a non-circular portion or head Q², which may be set into a corresponding socket Q³ to key the shaft from turning out of such socket, so the shaft may be turned to set the shovel up out of the ground. In effecting this result I provide on the shaft, which may carry two shovels, as shown, or more, if desired, a grooved collar in which operates a lever Q⁴, which is pivoted at Q⁶ and is arranged at its upper end Q⁵ for operation by the foot and to engage with a rack Q⁷. This lever may be operated to push the shaft forward and set the head Q² out of the socket Q³. This forward movement of the shaft Q' also brings a pin or projection Q⁸ thereon in engagement with a cam Q⁹, which partially rotates the shaft to throw the shovel laterally out of the ground, where it can be held by the rack Q⁷ when not in use. When it is desired to again bring the shovel into use, it is only necessary to release the lever from the rack Q⁷, when the weight of the shovel will lower it to the ground and it will be forced back, bringing the head Q² into the socket to receive it.

The cultivating-shovels P' are carried on standards P², whose upper ends are secured to the lugs G² of the sleeves G, and brace-bars P³ are connected at their lower ends adjustably with the standards P² and extend thence forward and upward and are secured at their front ends to the framing. By this construction the shovels P' are supported in such manner that they can be readily adjusted as may be desired. All shovels or plows may be provided with break-pins at the forward ends of the brace-bars.

In the construction shown in Fig. 7 the drive-gear is so connected with the chopper as to reciprocate or oscillate said chopper instead of revolving the same in the operation of the machine, and the chopper proper employed in such construction may be that shown in Fig. 8.

In Fig. 9 I show a somewhat different arrangement of the cultivating-shovels, in which the standard R is carried by two hangers R' R², connected at their upper ends to the beams 6 and 7 and adjustably connected with the standard R.

Manifestly various forms of covering and cultivating shovels and supports therefor may be employed whenever desired.

The gear B' drives the chopper when the parts are operatively connected. To this end the shaft L is provided between the beams 6 and 7 with a grooved collar for engagement by the operating-lever S, which engages a rack S', and may be operated by the foot to push the shaft L forward against the action of the spring T and so move the shaft L longitudinally to set its pinion $B^2$ out of mesh with the gear B when it is not desired to operate the chopping devices. When the lever is released, the spring T will push the shaft L back to set its pinion into mesh with the drive-gear B'.

Having thus described my invention, what I claim, and desire to secure by Letters Patent, is—

1. An implement substantially as described comprising the main frame, the axle, the sleeves fitted on the axle, the boxes embracing the sleeves and provided with lugs for the connection of the shovel-standards, the shovel-standards held to said lugs, the drive-wheels, and gear on the axle, the chopping-shaft having a pinion arranged to mesh with the gear of the axle, means whereby the pinion and gear may be set into and out of mesh, and the chopping devices carried by the chopping-shaft, substantially as set forth.

2. In an implement substantially as described, the combination with the chopping-shaft, means for operating the same, the chopping device consisting of the blade, the arms carrying said blade and fitting and slidable at a point between their ends along the shaft, and means whereby said arms may be adjusted along the shaft, substantially as set forth.

3. In an implement substantially as described, the combination of the chopping-shaft, means whereby it may be operated, the arms fitting on said shaft and provided with break-pins fitting and sliding in slots extending longitudinally of the chopping-shaft and the chopping-blade carried by said arms, substantially as set forth.

4. In an implement substantially as described, the combination of the axle, the wheels thereon, the sleeves on said axle, the boxes secured to said sleeves, the frame-beams and shovel-standards secured to said boxes, and the chopping devices substantially as set forth.

5. The combination of the shaft carrying the shovel and movable rotarily and longitudinally, combined with means for moving said shaft longitudinally, and means whereby the shaft may be turned as it is moved longitudinally to set the shovel clear of the ground.

6. The combination of the axle, the cam-surface thereon inclining outwardly toward its forward end, the collar free on the axle and arranged at its inner end to engage the cam-surface thereof and having its outer end ratcheted, and the wheel free on the axle and ratcheted at its inner end to engage the ratchet-teeth of the said collar substantially as set forth.

7. The combination of the frame-beam the barring-off shovels, and the double standard supporting the same bowed above the beam, and having its upright arms pivoted to the beam and supporting the shovels substantially as set forth.

8. In a machine substantially as described, the combination of a shovel, a shaft supporting said shovel and movable longitudinally into and out of position in which it may rotate, means for preventing the rotation of the shaft in one of its positions, means for shifting the shaft longitudinally from its non-rotating to its rotatable position and means for rotating the shaft operating by its longitudinal movement, substantially as set forth.

9. The combination of a shovel, a shaft supporting the same and movable longitudinally and rotarily, means for preventing the shaft from turning in the operative adjustment of the shovel, and means whereby the shaft may be turned substantially as set forth.

10. The combination of the chopper-shaft, the chopper proper shiftable longitudinally thereon, means for shifting the chopper on its shaft, the pinion on the chopper-shaft, the drive-gear with which said pinion may engage, and means for shifting the chopper-shaft to set its pinion into and out of mesh with the drive-gear substantially as set forth.

11. The combination of the cultivator-shovel and its standard R, the framing, and the braces R' and $R^2$ securing said standard to the framing and adjustable substantially as set forth.

In testimony whereof I have signed my name to this specification in the presence of two subscribing witnesses.

EDWARD JEFFERSON BRYAN.

Witnesses:
C. H. BLACK,
C. B. REYNOLDS.